Patented Mar. 25, 1952

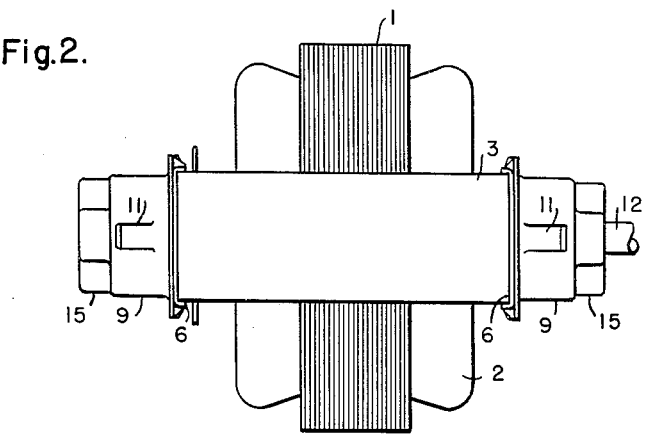
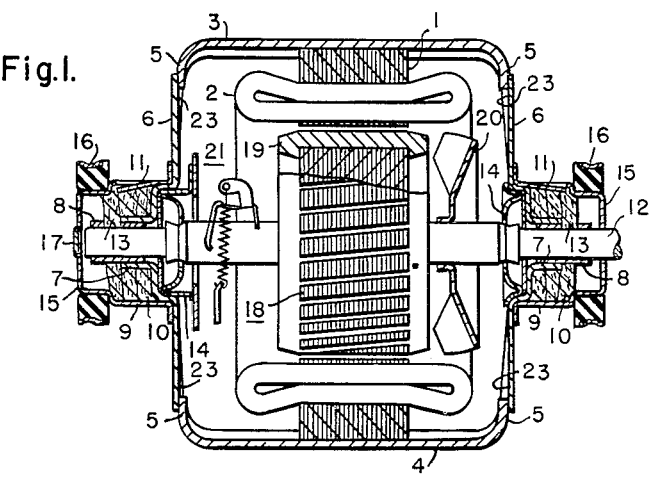
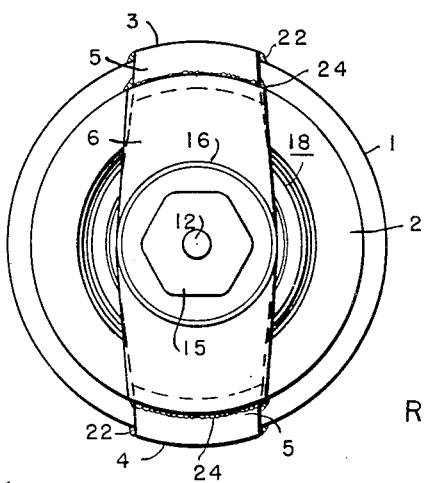

2,590,525

UNITED STATES PATENT OFFICE 2,590,525

DYNAMOELECTRIC MACHINE CONSTRUCTION

Raymond W. Esarey, Lima, Ohio, assignor to Westinghouse Electric Corporation, East Pittsburgh, Pa., a corporation of Pennsylvania Application June 16, 1949, Serial No. 99,438

3 Claims. (Cl. 171—252)

The present invention relates to the construction of dynamo-electric machines and, more particularly, to an electric motor which can be easily and inexpensively manufactured.

In the conventional construction of dynamo-electric machines, the bearings are supported in end brackets which are secured to a frame member surrounding the stator core. This type of construction requires machining of the frame to provide a bracket fit which must be made accurately concentric and square with the bore of the stator core. A corresponding fit must be machined on the brackets with equal accuracy, to obtain concentricity of the rotor with respect to the stator and proper alignment of the bearings. A bore for the bearing must also be accurately machined in the bracket, and additional machining of the bracket is usually necessary to provide for mounting the bracket in place and frequently to provide for mounting means for the machine, such as rubber rings. Machining is often also necessary to permit mounting other devices, such as a speed-responsive switch in the case of many single-phase motors. Thus, a relatively large amount of accurate machining is required in the manufacture of dynamo-electric machines of conventional construction. The manufacture of conventional dynamo-electric machines, therefore, is a relatively expensive process because of the large amount of accurate machining, which involves high labor costs and large investment in machine tools and other equipment.

The principal object of the present invention is to provide a dynamo-electric machine which can be manufactured easily and at relatively low cost.

Another object of the invention is to provide a construction for dynamo-electric machines which requires a minimum amount of machining, and which utilizes very much less material than conventional constructions.

A further object of the invention is to provide a dynamo-electric machine of skeleton construction, having parts which can readily be produced by means of dies in inexpensive press operations, and which can be assembled by press-fitting and welding with a minimum amount of machining, so that a very inexpensive construction results and the machine can be manufactured at low cost.

Other objects and advantages of the invention will be apparent from the following detailed description, taken in connection with the accompanying drawing, in which:

Figure 1 is a longitudinal sectional view of an electric motor embodying the invention;

Fig. 2 is a top plan view of the motor of Fig. 1; and

Fig. 3 is an end view of the motor.

The construction of the present invention is especially suitable for electric motors of the fractional horsepower sizes, although it will be apparent that its usefulness is not restricted to any particular type or size of machine, and that it is generally applicable to any dynamo-electric machine having an annular stator core.

The particular machine shown in the drawing for the purpose of illustration is a single-phase induction motor, which may be of the split-phase type, for example. The motor has a laminated stator core 1 of any suitable or usual construction which carries primary windings 2 disposed in slots in the core in the usual manner. The motor also has two longitudinal side supports 3 and 4, which are secured to the outer surface of the core 1 at diametrically opposite points, and which extend longitudinally of the motor beyond the core and beyond the end turns of the winding 2. The ends of the longitudinal supports 3 and 4 are bent radially inward, and their outer surfaces 5 are made accurately square with the bore of the stator core 1, that is, the surfaces 5 at each end of the motor lie in a plane which is accurately perpendicular to the axis of the core 1.

A bearing support 6 is provided at each end of the motor for supporting the bearings, the two bearing assemblies being identical. Each of the bearing supports 6 is an elongated member extending transversely of the motor between the longitudinal side supports 3 and 4. Each bearing support 6 has a central tubular portion 7 extending axially of the motor, and a sleeve-type bearing 8 is supported in the tubular portion 7, the bearing being pressed in place or otherwise firmly secured.

Any suitable means may be utilized for lubricating the bearing and any desired type of bearing assembly may be utilized. In the preferred embodiment shown in the drawing, the bearing assembly is of the type disclosed and claimed in my copending application Serial No. 104,687, filed July 14, 1949, now Patent No. 2,583,141, and assigned to the Westinghouse Electric Corporation. As more fully described in that application, the bearing assembly includes a generally cylindrical housing member 9 which encloses the bearing 8, and which is secured to the bearing support 6 by welding, or in any other suitable manner. The bearing is lubricated by means of oil-saturated wicking 10 disposed in the housing 9 around the bearing. An integral portion 11 of the upper part of the housing 9 is partially severed, and after assembly of the wicking and bearing housing, the portion 11 is bent inward, as shown in Fig. 1, to apply resilient pressure to the wicking 10 to force it into contact with the shaft 12 through the window 13 of the bearing 8, and to provide an opening for supplying additional oil to the wicking 10. A bearing cap 14 of any suitable type is pressed into the tubular portion of the bearing support 6 to prevent leakage of oil into the motor. The housing 9 preferably has an axially extending portion 15 of smaller diameter, which may be hexagonal in cross-section, as shown in Fig. 3, or which may be of any other suitable shape, for receiving a resilient mounting ring 16 for resiliently mounting the motor to prevent transmission of vibration to the supporting structure on which the motor is mounted. The portion 15 of the bearing housing 9 has a central opening at the outer end, through which the shaft 12 passes at one end of the machine. The corresponding opening in the housing 9 at the other end of the machine is closed by a cap 17.

A rotor member of any suitable construction is mounted on the shaft 12. As shown in the drawing, the rotor is of usual design and has a laminated core 18 carrying a squirrel-cage winding 19. A fan 20 may also be mounted on the shaft 12 if desired. The particular motor shown for the purpose of illustration is of the split-phase type and is provided with a speed-responsive switch 21 for controlling the motor windings, the rotating part of the switch being mounted on the shaft 12 while the stationary part may be mounted on the adjacent bearing cap 14. It will be understood, of course, that the switch 21 may be omitted if the motor is of a type which does not require the use of such a switch.

In the manufacture of a motor embodying the invention, the laminated stator core 1 is assembled and the laminations clamped together by rivets, or otherwise, in any usual or desired manner, and the winding 2 is placed in the slots of the core 1. The longitudinal side supports 3 and 4 are formed to the desired size and shape, preferably in a press, and they are rigidly secured to the outer surface of the core 1 at diametrically opposite points by welding directly to the core, as indicated at 22. The outer surfaces 5 of the end portions of the side supports 3 and 4 are then faced or machined to make them flat and accurately perpendicular to the axis of the core 1. The bearing supports 6 may also be formed in a press, by means of suitable dies, to the desired size and shape, and the extending end portions of the bearing supports are preferably coined so that their inner surfaces 23 are flat and lie in the same plane. The bearing 8 is then pressed into the tubular portion 7 and bored to make the axis of the bearing accurately perpendicular to the plane of the surfaces 23. The bearing assembly is completed by putting the wicking 10 and the bearing housing 9 in place, the housing 9 being preferably spot welded to the support 6, and the bearing cap 14 is pressed into place. The rotor member may be assembled on the shaft 12 in any usual or desired manner.

The complete motor is assembled by placing the stator core 1, with the winding 2 and side supports 3 and 4 in place, in a suitable fixture which locates the core assembly in a predetermined position with respect to the fixture, using the outer surface of the core, or, if desired, locating holes punched in the laminations, for positioning the core. The rotor is then inserted in the bore of the stator core 1, and the bearing supports 6 are put in place with the bearings 8 on the journal portions of the shaft 12. The rotor is accurately located, or centered, in the stator core, preferably by means of center holes in the ends of the shaft, which are accurately centered with respect to the journal portions of the shaft. The fixture then clamps the bearing supports 6 in place with the coined surfaces 23 engaging the machined surfaces 5 of the side supports 3 and 4. The motor may then be tested while it is still clamped in the assembly fixture, and after test the ends of the bearing supports 6 are rigidly secured to the end portions of the side supports 3 and 4 by welding, as indicated at 24, or by riveting or bolting or any other suitable means. The assembly is then complete and the finished motor is removed from the fixture.

It will be apparent that the new construction permits rapid and inexpensive assembly of the motor since the assembly operations can be performed easily and quickly in a suitable fixture. Concentricity of the rotor and bearing alignment are assured by the engagement of the coined surfaces 23 with the accurately machined surfaces 5 of the side supports, since the bearings are bored to be accurately perpendicular to the surfaces 23. Thus, the only machining required is the facing of the surfaces 5 and the boring of the bearings. All the parts utilized in the construction of the motor are easily and inexpensively produced from steel sheet or plate in simple press operations, and with the exception of the two machining steps mentioned above, all assembly operations are simple press-fitting and welding operations. Thus the large amount of expensive machining required in conventional motor constructions is substantially eliminated and only an absolute minimum of machining is required. It is also to be noted that the skeleton construction results in a very considerable saving in material, as compared to the conventional constructions with continuous cylindrical frame members extending around the core, and circular end brackets. The new construction also makes possible an additional saving to the motor manufacturer in lower overhead resulting from reduction in the amount of material necessary to be stored, and reduction of the investment required in machinery and equipment. These savings are not achieved at any sacrifice of performance or efficiency, however, since the new motor is as strong mechanically and as accurately built as conventional motors.

A preferred embodiment of the invention has been shown and described for the purpose of illustration, but it will be apparent that various modifications may be made within the scope of the invention. Thus, if desired, a light housing or cover of sheet-metal or molded plastic material may be placed over the motor to protect the windings and other parts, and any suitable type of bearing assembly might be utilized. It is to be understood, therefore, that the invention is not limited to the specific details of construction shown and described, but in its broadest aspects it includes all equivalent embodiments and modifications which come within the scope of the appended claims.

I claim as my invention:

1. A dynamo-electric machine having a laminated stator core, a winding on said core, two longitudinal support members, said longitudinal support members being disposed on diametrically opposite sides of the core and secured rigidly thereto, the longitudinal support members extending axially beyond the ends of the core and having radially inwardly extending end portions, the outer surfaces of said end portions being accurately perpendicular to the axis of the stator core, elongated bearing support members disposed at opposite ends of the machine, each of said bearing support members having flat end surfaces lying substantially in the same plane, a bearing on each of said bearing support members, the axis of the bearing being accurately perpendicular to the end surfaces of the bearing support member, said bearing support members extending transversely of the machine, the end surfaces of the bearing support members engaging the outer surfaces of the end portions of the longitudinal support members and being rigidly secured thereto, and a rotor member supported in said bearings.

2. A dynamo-electric machine having a laminated stator core, a winding on said core, two longitudinal support members, said longitudinal support members being disposed on diametrically opposite sides of the core and secured rigidly thereto, the longitudinal support members extending axially beyond the ends of the core and having radially inwardly extending end portions, the outer surfaces of said end portions being accurately perpendicular to the axis of the stator core, elongated bearing support members disposed at opposite ends of the machine, each of said bearing support members having flat end surfaces lying substantially in the same plane, each of said bearing support members having a central tubular portion, a bearing mounted in the tubular portion, the axis of the bearing being accurately perpendicular to the end surfaces of the bearing support member, a bearing housing surrounding the tubular portion, and lubricating means for the bearing disposed in the bearing housing, said bearing support members extending transversely of the machine, the end surfaces of the bearing support members engaging the outer surfaces of the end portions of the longitudinal support members and being rigidly secured thereto, and a rotor member supported in said bearings.

3. A dynamo-electric machine having a laminated stator core, a winding on said core, two longitudinal support members, said longitudinal support members being disposed on diametrically opposite sides of the core and secured rigidly thereto, the longitudinal support members extending axially beyond the ends of the core and having radially inwardly extending end portions, the outer surfaces of said end portions being accurately perpendicular to the axis of the stator core, elongated bearing support members disposed at opposite ends of the machine, each of said bearing support members having flat end surfaces lying substantially in the same plane, each of said bearing support members having a central tubular portion, a bearing mounted in the tubular portion, the axis of the bearing being accurately perpendicular to the end surfaces of the bearing support member, a bearing housing surrounding the tubular portion, and lubricating means for the bearing disposed in the bearing housing, said bearing support members extending transversely of the machine, the end surfaces of the bearing support members engaging the outer surfaces of the end portions of the longitudinal support members and being rigidly secured thereto, a rotor member supported in said bearings, and resilient supporting means for the machine carried on said bearing housings.

RAYMOND W. ESAREY.

REFERENCES CITED

The following references are of record in the file of this patent:

UNITED STATES PATENTS

| Number | Name | Date |
| --- | --- | --- |
| 1,825,064 | Hobart | Sept. 29, 1931 |
| 1,919,522 | Lipman | July 25, 1933 |
| 2,143,739 | McCabe | Jan. 10, 1939 |
| 2,367,428 | Divi | Jan. 16, 1945 |
| 2,460,063 | Cole | Jan. 25, 1949 |